Patented Nov. 12, 1929

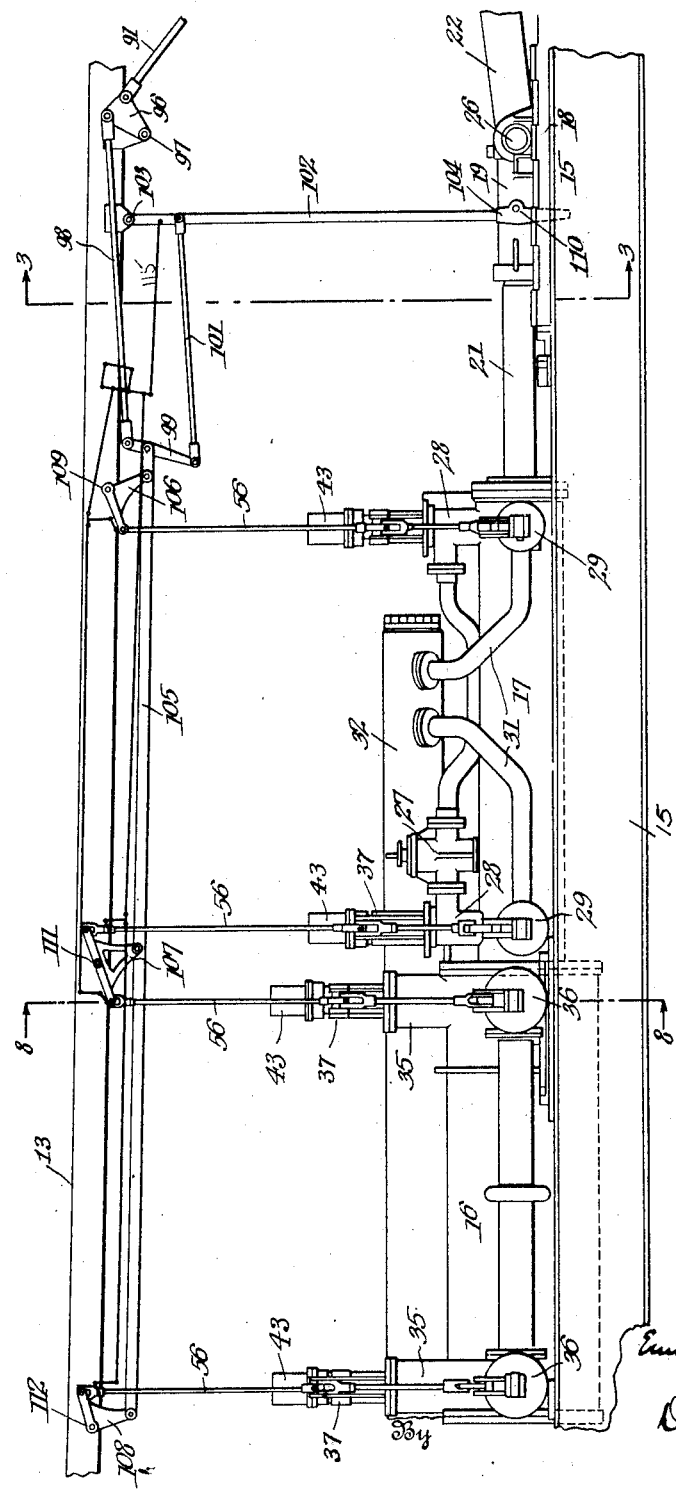

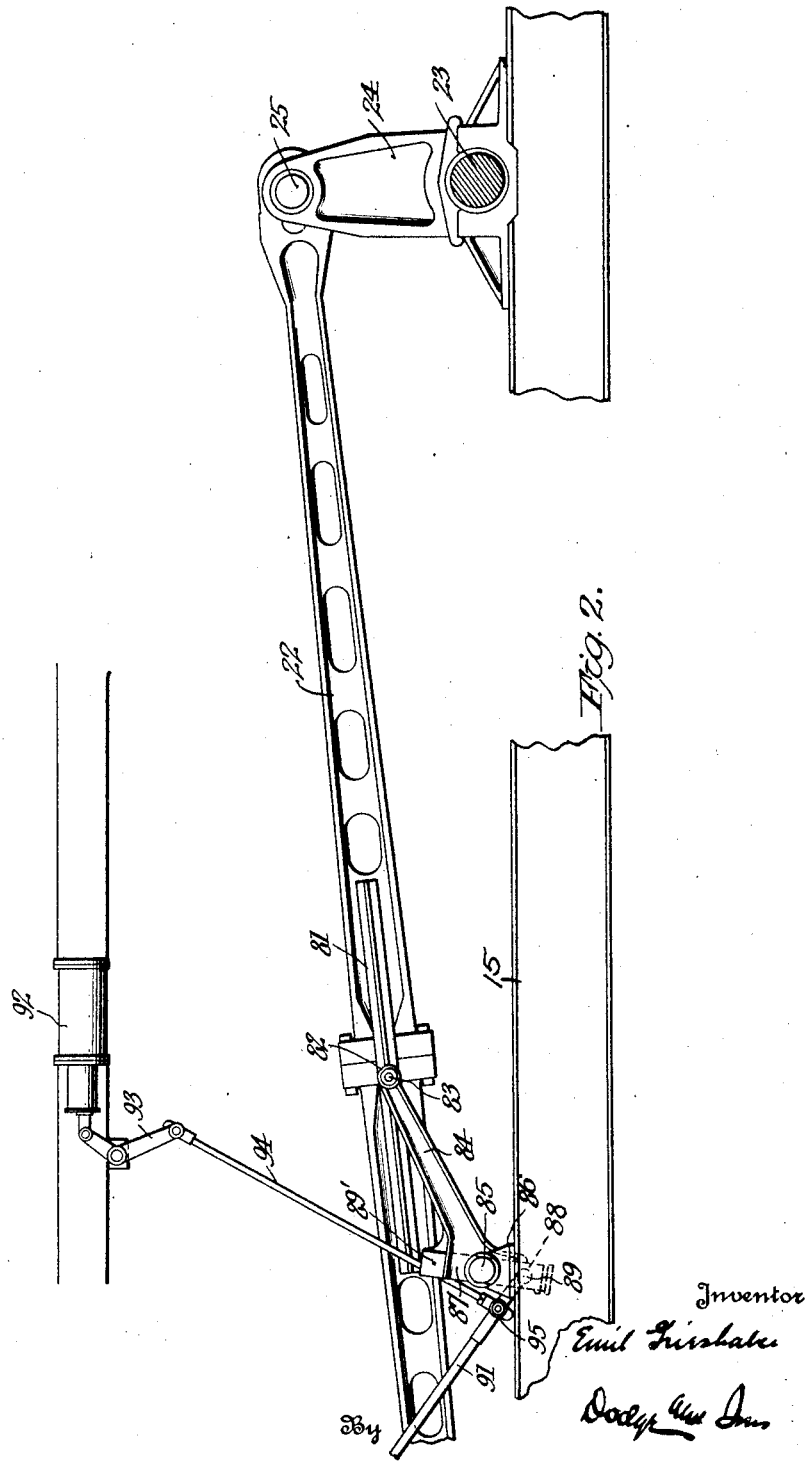

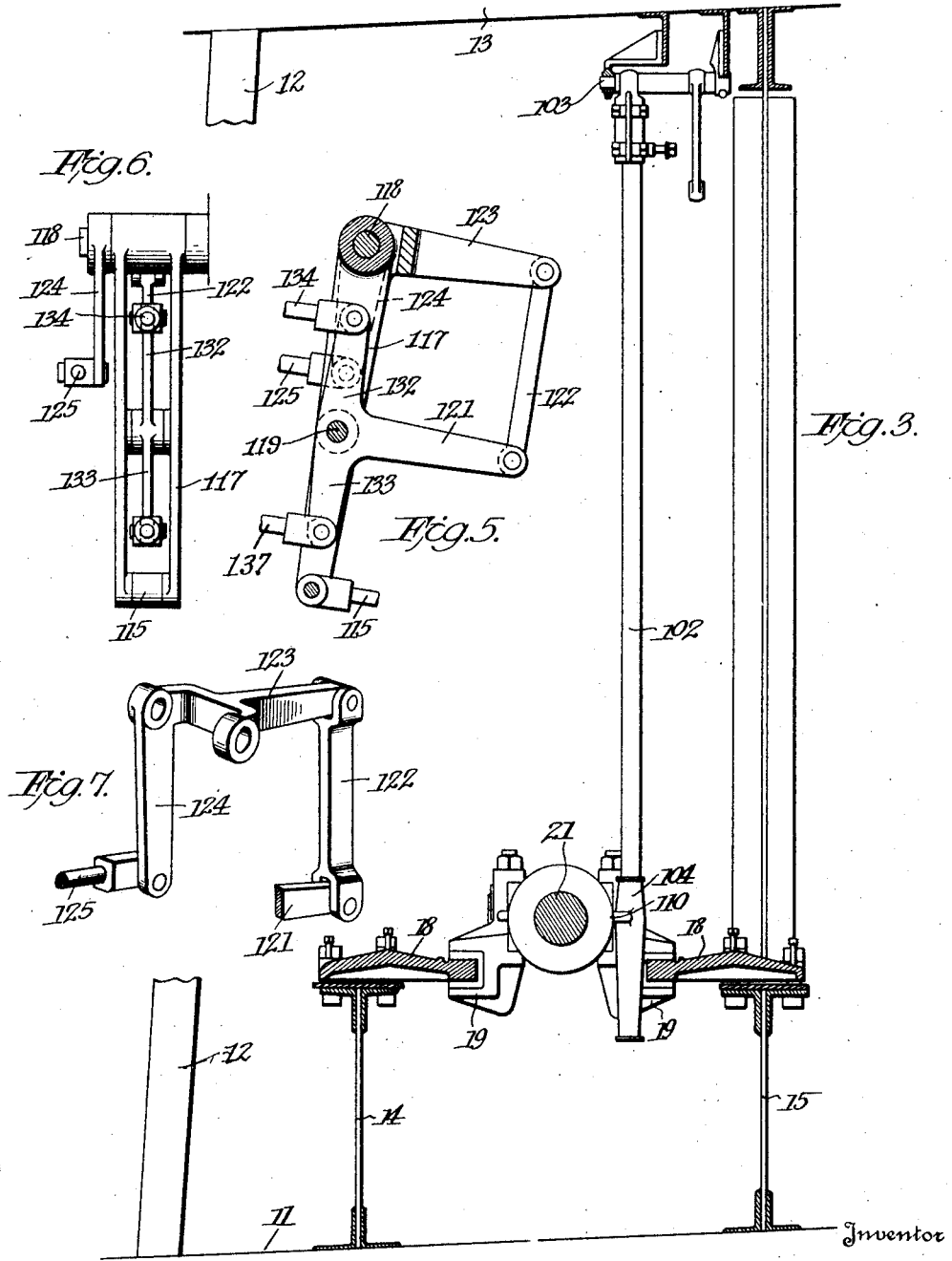

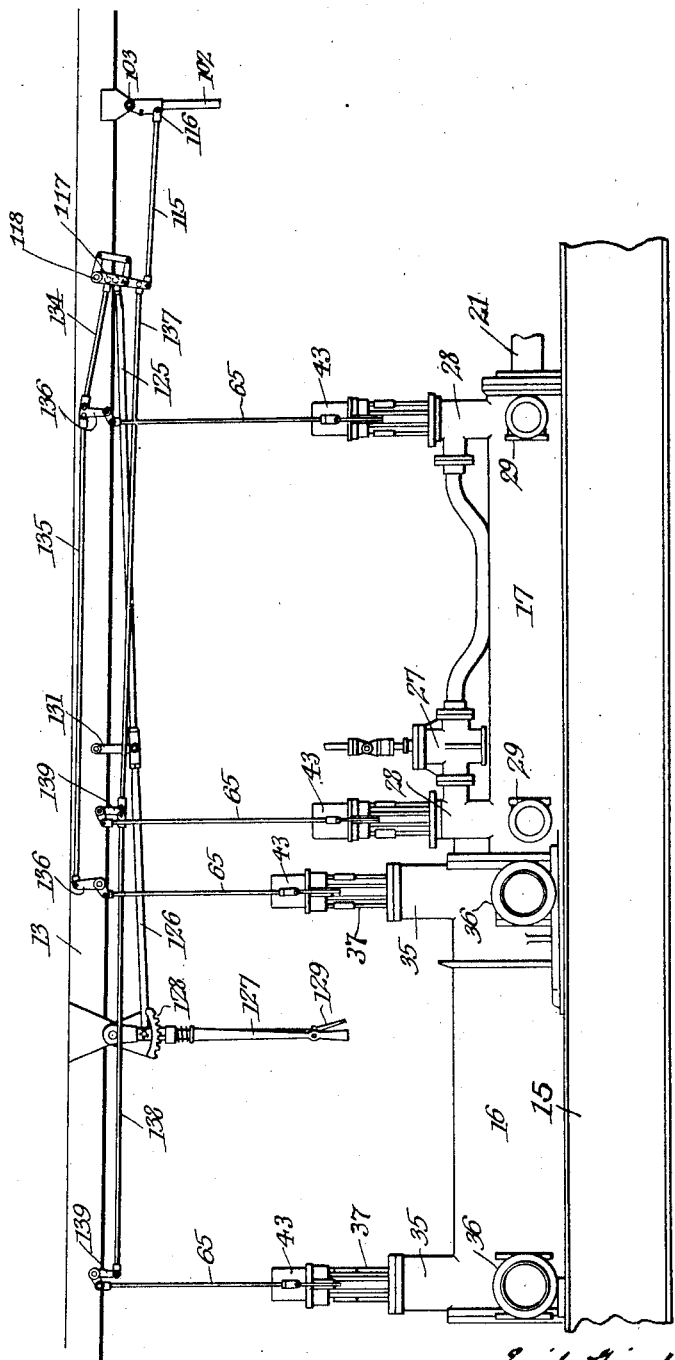

1,735,045

UNITED STATES PATENT OFFICE

EMIL GRIESHABER, OF MILWAUKEE, WISCONSIN, ASSIGNOR TO NORDBERG MANUFACTURING COMPANY, OF MILWAUKEE, WISCONSIN, A CORPORATION OF WISCONSIN

VALVE GEAR

Application filed September 19, 1927. Serial No. 220,407.

This invention relates to variable cut off valve gears for steam engines and is capable of embodiment in a reversing valve gear.

Generally stated, the mechanism is of the drop cut-off type and is so designed that the timing of the valve gear is not disturbed by the expansion and contraction of the cylinder. In large units this is a very important factor, because the expansion incident to the heating of the engine cylinder is sufficient to produce material derangement of valve gears of conventional types.

Another feature of the invention is a control of the cut-off trip mechanism in such a way that it derives motion from the cross head, or some part moving synchronously therewith, with the result that the possible maximum cut-off is materially increased.

In order to develop all the various possibilities of the invention it will be here described as applied to a tandem compound reversing engine of a type used in stern wheel tow boats, but it is available for other uses. For example, it is not essential that the engine be of the tandem type or even of the compound type, nor is it essential that the engine be of the reversing type.

In the accompanying drawings,—

Fig. 1 is a side elevation of the two tandem cylinders with the receiver, piston rod, cross head and cross head guides. In this view the valve motion is shown in elevation, and the linkage for controlling the trip mechanism which operates the drop cut-off gear to vary the time of cut-off is shown in diagram.

Fig. 2 is a side elevation forming a continuation of Fig. 1 and showing the crank, connecting rod and reversing linkage. Between the two figures a small portion of the structure is broken away.

Fig. 3 is a section on the line 3—3 of Fig. 1, on an enlarged scale.

Fig. 4 is a side elevation, similar to Fig. 1, but on a somewhat smaller scale, omitting the valve motion linkage, and showing in elevation the trip mechanism which is only diagrammatically shown in Fig. 1.

Fig. 5 is an enlarged fragmentary view of the parallel motion forming a part of the showing in Fig. 4. Portions of the linkage are broken away.

Fig. 6 is a side elevation of the parallel motion shown in Fig. 5, looking to the right relatively thereto.

Fig. 7 is a perspective view of a bell crank forming part of the linkage structure shown in Fig. 5.

Figure 8:
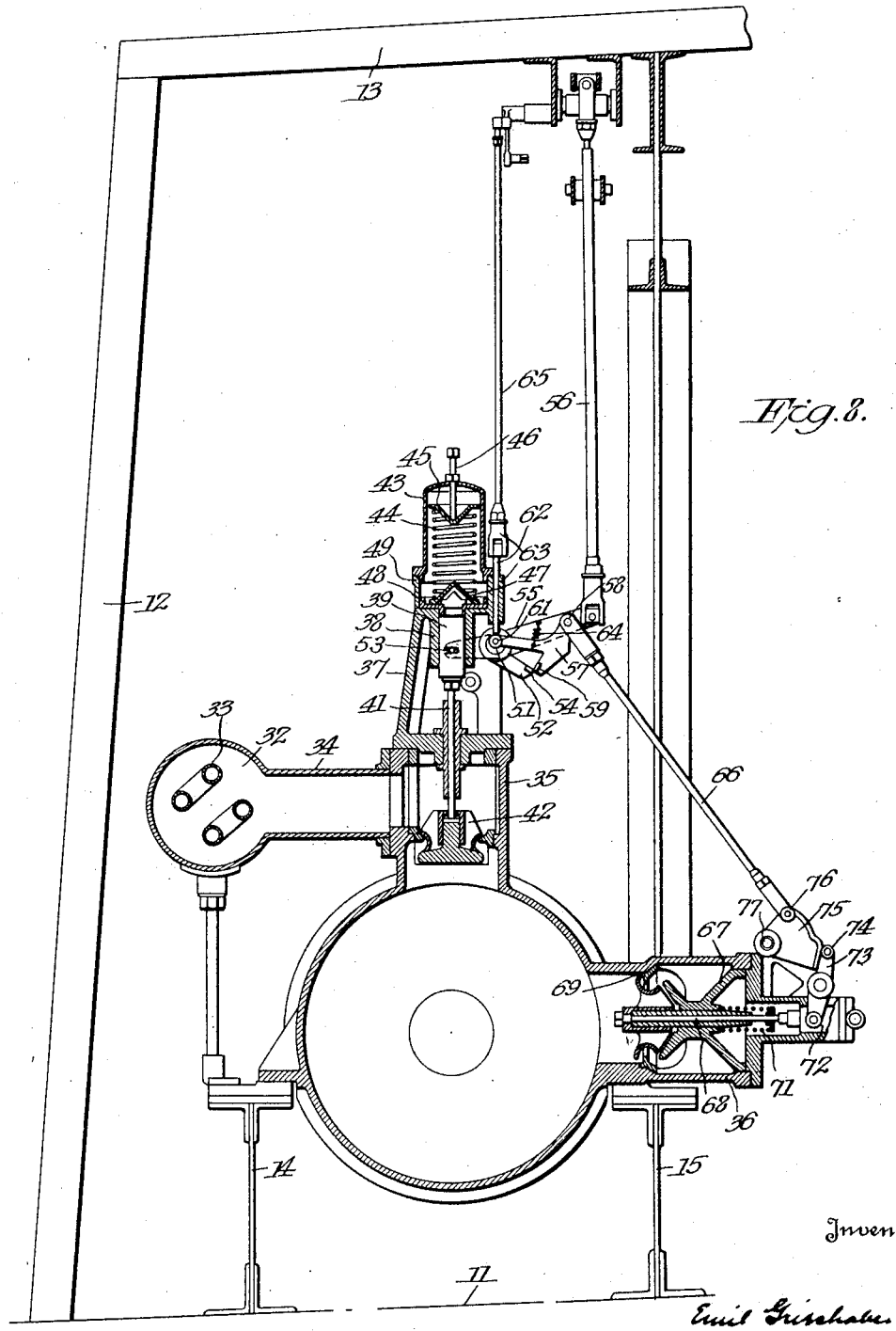
Fig. 8 is a section on the line 8—8 of Fig. 1, the parts being shown on an enlarged scale.

The deck of the tow-boat is indicated at 11 and a part of the framing of the tow-boat is illustrated at 12, 13. As will hereafter appear, the valve actuating and the trip mechanisms are suspended from the framing of the boat above the cylinder structure, but it will be obvious to those skilled in the art that this mechanism might be supported upon the bed-plate of the engine, as is common practice. The construction shown is adopted merely because it is convenient to tow-boat installations.

The members 14 and 15 are girders forming a portion of the base framing of the engine and resting upon the deck. The low pressure cylinder is shown at 16, the high pressure cylinder at 17, the cross head guides at 18, the cross head at 19 and the piston rod at 21. The connecting rod is shown at 22, crank shaft at 23, crank at 24 and crank pin at 25. The wrist pin is shown at 26. The main throttle valve 27 controls communication to the inlet steam valve chests 28, 28, of the high pressure cylinder 17. The exhaust valve chests of this cylinder are shown at 29, 29. The exhaust steam discharged by these valves passes through the pipes 31, 31, into a receiver 32, which, as indicated in Fig. 8, may be provided with steam heating coils 33. From the receiver 32 the steam passes by connections 34, 34 to the inlet valve chests 35, 35, of the low pressure cylinder 16. The exhaust valve chests of the low pressure cylinder 16 are shown at 36, 36.

The parts so far described conform generally to known practice.

Referring now to Fig. 8, the inlet and exhaust valve mechanism of the low pressure cylinder will be described; it being understood that the inlet and exhaust valve mechanisms of the high pressure cylinder are essentially identical. On Fig. 1 similar parts of the two valve mechanisms are indicated by the same reference numerals, so that it will be unnecessary to describe the high pressure mechanism in detail.

Mounted on top of the steam chest 35 is a bonnet 37 which has a guide 38 for the valve stem cross head 39 to which is attached the stem 41 of the poppet inlet valve 42. This may be of any usual construction, that illustrated in the drawings being familiar to those skilled in the art. Above the bonnet 37 is a housing 43 which encloses a valve closing spring 44. This spring is confined between a spring seat 45 adjustable by means of the thrust screw 46 and a spring seat 47. This reacts against a piston 48. The piston 48 is connected with the cross head 39 and works in a cylinder 49 to check the closing movement of the valve 42 by the dash-pot action of the piston.

A pin 51 supported by bonnet 37 serves as a fulcrum for lever 52 which has a pin and slot connection 53 with the cross head 39. Lever 52 has at its end opposite from 53 a latch nose 54. Also pivoted on pin 51 is a lever 55 oscillated by a vertical adjustable reach rod 56. The lever 55 carries a latch member 57 which is pinned at 58 to the lever 55 and has a latch nose 59 which is designed to engage, depress and then release the latch nose 52 as the lever 55 oscillates.

The latch member 57 has an arm or tail 61 which projects inward toward, and slightly above, the axis of the pin 51 in position to be engaged by a thrust rod 62 guided for vertical sliding motion in the guideway 63 also supported by the bonnet 37. A spring 64 of any suitable form may be used to urge the latch 57 in engaging direction and consequently into contact with the end of the thrust rod 62. The thrust rod 62 is moved vertically by an adjustable reach rod 65.

Also pivoted at 58 to the lever 55 is a link or reach rod 66 which serves as the means for actuating the exhaust valve. The bonnet 36 carries a valve housing 67 which guides the stem 68 of the poppet exhaust valve 69. This valve is urged in a closing direction by a spring 71 and is actuated through a cross head 72 by means of a rock lever 73. The lever 73 has a roller 74 which has contact with the cam 75 pivoted at 76 to the lower end of the reach rod 66. The cam 75 is pivoted to the bonnet 67 at 77, and is oscillated by the reciprocation of the rod 66.

The mechanism just described is used at each end of each cylinder, there being of course an inlet and an exhaust valve for each end of each double-acting cylinder.

There are various known methods of deriving a valve motion, and it is immaterial to the present invention just how the motion is derived. For purposes of illustration there has been chosen in the present case a valve motion derived partly from the connecting rod and partly from the cross head, and this motion will now be traced, starting with the connecting rod and tracing it back to the reach rods 56 above mentioned.

Mounted on the connecting rod is a longitudinal guide 81, with which coacts a slider 82 pinned at 83 to an arm 84. The arm 84 is pivoted at 85 to a bearing bracket 86 carried by the girder 15. Formed integrally with the lever 84 is a diagonal cross guide 87 in which works a slider 88, and to this slider is pinned at 89 one end of a reach rod 91. The center of the pin 89 may be carried by the slider 88 to the extreme lower position 89, or the corresponding extreme upper position indicated geometrically by the point 89'.

The slider moves from one to the other limit of motion and there is no intermediate setting. It is shifted between positions 89, 89' by a hydraulic motor 92 controlled in any suitable manner and acting through the bell crank 93 and link 94, the latter being pinned to the reach rod 91 at 95. When the engine is running the lever 84 oscillates. The effect of shifting between the positions 89 and 89' is to reverse the direction of motion of the reach rod 91 relatively to the connecting rod 22.

Referring now to Figs. 1 and 3, the reach rod 91 is connected to a rocker plate 96 which is pivoted at 97 and supported by a portion of the framing 13. The rocker plate 96 is connected by the link 98 with the upper end of a floating lever 99. The lower end of the lever 99 is connected by a link 101 with a swinging arm 102 which is fulcrumed at 103 on the framing 13 and which slides through a sleeve 104 pinned at 110 to the cross head 19. Thus the floating lever 99 has a combined motion derived from the connecting rod 22 and from the cross head 19, the connection from the cross head 19 producing a modifying effect of such character as to give to the valve gear the characteristic of approximately constant lead.

Connected to floating lever 99 at a point intermediate its connection with the reach rod 98 and 101 is a reach rod 105 which is sustained by three parallel bell crank hangers 106, 107 and 108, each of which is pivotally supported respectively at the points 109, 111, 112 on the framing 13. The bell crank 107 is provided with two arms, one connected to the reach rod 56 of the high pressure head end valve and the other to the reach rod 56 of the low pressure crank end valve. The bell crank 106 operates the crank end reach rod 56 of the high pressure cylinder and the bell crank 108 operates the head end reach rod 56 of the low pressure cylinder.

Referring now particularly to Figs. 4, 5, 6 and 7, the reach rod 115 is pivoted at 116 to the swinging arm 102 a short distance below the fulcrum 103. The other end of the reach rod 115 is connected to a bifurcated lever 117 which swings on a pivot 118 supported on the framing 13. Pivoted at 119 at about mid-length of the lever 117 is a lever having three arms, two of which extend in opposite directions from the fulcrum and the third of which extends at right angles thereto. This last and approximately horizontal arm 121 is connected by an approximately vertical link 122 with the horizontal arm 123 of a bell crank whose other arm 124 is connected by reach rods 125 and 126 with a cut-off lever 127. This lever has a latch coacting with a notched sector 128 so that it may be locked in various adjusted positions. The latch may be released by a hand trigger 129 of ordinary construction.

The reach rods 125 and 126 are articulated with each other and are guided by a suspender link 131 pivoted to the frame 13. The members 121 and 123 together with the link 122 and lever 117 form a parallelogram. From this it follows that in any fixed adjustment of the bell crank 123, 124, the arm 121 has translatory motion in a curved path. From this it follows that the two arms 132, 133 connected with the arm 121 also have translatory motion in a similar curved path.

The arm 132 is connected by reach rods 134 and 135 with identical bell cranks 136, 136, which are connected with the reach rod 65 associated with the two crank end valve mechanisms. Similarly the arm 133 is connected by reach rods 137 and 138 with bell cranks 139, 139, pivoted to the frame member 13. The bell cranks 139 are connected with the reach rods 65 of the two head end valve mechanisms. The bell cranks 136 are reversely arranged as compared with the bell cranks 139, so that motion of the reach rod 134 to the right, and motion of the reach rod 137 to the left, affect their respective reach rods 65 in the same sense.

It follows from the connections above described, that by shifting the lever 128 it is possible to vary the limits of motion of all the reach rods 65 in the same degree and in the same sense. The parallel motion illustrated in Figs. 5, 6 and 7, provides for simultaneous adjustment of the motion of the reach rods 65 and consequently of their connected trip members 62 while the engine is in motion.

It will be observed that reversal is produced by the action of the hydraulic motor 92 and that variation of cut-off for both directions of rotation is controlled by adjustment of the lever 127.

The reach rods 135, 137 and 138, as well as the reach rod 105, may be located far enough from the cylinders to be uninfluenced by temperature changes in the cylinders. Furthermore, since the reach rods 65 and 56 are relatively long and extend in directions at right angles to the reach rods through which they are operated, expansion and contraction of the cylinders will develop no disturbing effect on the valve timing.

By combining the motion of the connecting rod or some equivalent moving part with the cross head motion it is possible to secure approximately constant lead. By operating the trip members 62 from the cross head, it is possible to secure a very wide range of cut-off adjustment, that is to say, very long cut-offs where these are desired.

As stated, it is not essential that the engine be of the reversing type, nor is it essential that the valve motion be derived from the connecting rod, as other approximately equivalent mechanisms may be substituted.

What is claimed is,—

1. The combination of a steam engine including a cylinder, piston, cross head, connecting rod, and crank; an inlet valve for said cylinder; an oscillating member; a latch for connecting and disconnecting said valve to and from said oscillating member; means for tripping said latch; a pair of reach rods extending approximately parallel with the axis of said cylinder; driving connections from one of said reach rods to said oscillating member and from the other of said reach rods to said latch tripping means, said driving connections extending in directions substantially perpendicular to the axis of the cylinder; and means for driving said reach rods in timed relations with said engine.

2. The combination of a steam engine including a cylinder, piston, cross head, connecting rod, and crank; an inlet valve for said cylinder; an oscillating member; a latch for connecting and disconnecting said valve to and from said oscillating member; means for tripping said latch; a pair of reach rods extending approximately parallel with the axis of said cylinder; driving connections from one of said reach rods to said oscillating member and from the other of said reach rods to said latch tripping means, said driving connections extending in directions substantially perpendicular to the axis of the cylinder; and means for driving said reach rods the second named reach rod being driven in synchronism with the cross head of the engine.

3. The combination of a steam engine including a cylinder, piston, cross head, connecting rod, and crank; an inlet valve for said cylinder; actuating means for said valve including an oscillating member; a latch for connecting and disconnecting said valve to and from said oscillating member; means for tripping said latch; a pair of reach rods extending approximately parallel with the axis of said cylinder; driving connections from one of said reach rods to said oscillating member and from the other of said reach rods to said latch tripping means, said driving connections extending in directions substantially perpendicular to the axis of the cylinder; means for driving the first named reach rod by the combined motion of the cross head and connecting rod; and independent means for driving the second named reach rod in synchronism with the cross head.

4. The combination of a steam engine including a cylinder, piston, cross head, connecting rod, and crank; an inlet valve for said cylinder; actuating means for said valve including an oscillating member; a latch for connecting and disconnecting said valve to and from said oscillating member; means for tripping said latch; a pair of reach rods extending approximately parallel with the axis of said cylinder; driving connections from one of said reach rods to said oscillating member and from the other of said reach rods to said latch tripping member, said driving connections extending in directions substantially perpendicular to the axis of the cylinder; means for driving the first named reach rod by the combined motion of the cross head and connecting rod; independent means for driving the second named reach rod in synchronism with the cross head; and means operable while the engine is in motion for adjusting the position of said second reach rod relatively to the cross head.

5. The combination with a steam engine having a cylinder and cross head, of drop cut-off inlet valves at the opposite ends of the cylinder, said drop cut-off valves including each a movable tripping mechanism; connections from the cross head to said tripping mechanism to actuate the same; and adjustable means interposed in said connections for adjusting the position of said tripping mechanism relatively to said cross head.

6. The combination of an engine including a cylinder and cross head, of an inlet valve mechanism of the drop cut-off type, including a valve; a moving part for driving said valve; means for latching said valve to said moving part; movable tripping means for releasing said latch; and connections for driving said movable tripping means synchronously with the cross head.

7. The combination on an engine including a cylinder and cross head, of an inlet valve mechanism of the drop cut-off type, including a valve; a moving part for driving said valve; means for latching said valve to said moving parts; movable tripping means for releasing said latch; connections for driving said movable tripping means synchronously with the cross head; and means interposed in said driving connections for adjusting the position of said tripping means relatively to said cross head.

8. The combination of an engine, including a cylinder and cross head, of an inlet valve mechanism of the drop cut-off type, including a valve; a moving part for driving said valve; means for latching said valve to said moving part; a movable tripping means for releasing said latch; and connections for driving said movable tripping means synchronously with the cross head, said connections including a reach rod movable longitudinally in a path approximately parallel with the axis of the cylinder, a bell crank connected with said reach rod, and a second reach rod connected with said bell crank and said tripping means and extending in a direction approximately at right angles to the axis of the cylinder.

9. The combination of an engine, including a cylinder and cross head, of an inlet valve mechanism of the drop cut-off type, including a valve; a moving part for driving said valve; means for latching said valve to said moving part; a movable tripping means for releasing said latch; and connections for driving said movable tripping means synchronously with the cross head, said connections including a reach rod movable longitudinally in a path approximately parallel with the axis of the cylinder, a bell crank connected with said reach rod, a second reach rod connected with said bell crank and said tripping means and extending in a direction approximately at right angles to the axis of the cylinder, and means interposed in the driving connections between said cross head and the first named reach rod for adjusting the position of said reach rod relatively to said cross head.

10. The combination of an engine, including a cylinder, piston, cross head, connecting rod, and crank; a pair of inlet valves for the opposite ends of said cylinder; actuating means for said valves each including an oscillating member; a latch for connecting and disconnecting said valve to and from said oscillating member; and means for tripping said latch; a reach rod extending approximately parallel with the axis of said cylinder; reversely arranged driving connections from said reach rod to the oscillating members of said two inlet valves; means for driving said reach rod in timed relation with the engine; a pair of reach rods both approximately parallel with the axis of said cylinder; reversely arranged driving connections from said two reach rods to the latch tripping mechanism of respective inlet valves; a lever pivotally connected to the last named two reach rods; a parallel motion upon which said lever is pivotally supported and by which it is guided for translatory motion; adjusting means associated with said parallel motion for varying the angular position of said lever; and a driving connection between the cross head and said parallel motion.

In testimony whereof I have signed my name to this specification.

EMIL GRIESHABER.